(12) United States Patent
Wu (10) Patent No.: US 9,071,513 B2
(45) Date of Patent: Jun. 30, 2015

(54) PATH SWITCH-BACK METHOD AND APPARATUS IN TRANSPORT NETWORK

(75) Inventor: Shaoyong Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 155 days.

(21) Appl. No.: 13/885,639

(22) PCT Filed: Jun. 14, 2011

(86) PCT No.: PCT/CN2011/075716
§ 371 (c)(1),
(2), (4) Date: May 15, 2013

(87) PCT Pub. No.: WO2012/065435
PCT Pub. Date: May 24, 2012

(65) Prior Publication Data
US 2013/0235718 A1 Sep. 12, 2013

(30) Foreign Application Priority Data
Nov. 19, 2010 (CN) .......................... 2010 1 0552933

(51) Int. Cl.
*G01R 31/08* (2006.01)
*G06F 11/00* (2006.01)
(Continued)

(52) U.S. Cl.
CPC ............ *H04L 41/0654* (2013.01); *H04L 41/08* (2013.01); *H04L 12/437* (2013.01); *H04L 41/0659* (2013.01); *H04L 41/0663* (2013.01); *H04L 45/22* (2013.01); *H04L 45/28* (2013.01)

(58) Field of Classification Search
None
See application file for complete search history.

(56) References Cited

U.S. PATENT DOCUMENTS 5,757,769 A * 5/1998 Ikawa ........................... 370/228
6,570,685 B1 * 5/2003 Fujita et al. ...................... 398/79
(Continued)

FOREIGN PATENT DOCUMENTS

| CN | 1870471 A | 11/2006 |
| CN | 101047440 A | 10/2007 |

(Continued)

OTHER PUBLICATIONS

Author Unknown, Cisco ONS 15454 Reference Manual, Oct. 2008, pp. 11-1 to 11-18.*

(Continued)

*Primary Examiner* — Christopher Crutchfield
(74) *Attorney, Agent, or Firm* — Oppendahl Patent Law Firm LLC (57) ABSTRACT

The disclosure discloses a path switch-back method and apparatus in a transport network, belongs to the field of communications, and is used for avoiding the problem that signals can not be switched back to a working path from a protection path when the links in two directions of the working path between nodes in the transport network are restored from fault simultaneously. The path switch-back method in a transport network provided by the disclosure includes: a local node determines two failed links on the working path between an opposite node and itself are restored to normal simultaneously (S101); the local node enters a Wait To Restore (WTR) state (S102); and the local node switches signals back to the working path when the WTR state ends (S103). The disclosure is used for realizing that signals are switched back to the working path from the protection path when the links in two directions of the working path between nodes in the transport network are restored from fault simultaneously.

8 Claims, 4 Drawing Sheets

(51) Int. Cl.
  *G08C 15/00*    (2006.01)
  *H04J 1/16*     (2006.01)
  *H04L 1/00*     (2006.01)
  *H04L 12/26*    (2006.01)
  *H04L 12/24*    (2006.01)
  *H04L 12/437*   (2006.01)
  *H04L 12/707*   (2013.01)
  *H04L 12/703*   (2013.01)

(56) References Cited

U.S. PATENT DOCUMENTS

2003/0117950 A1*  6/2003  Huang .......................... 370/220
2004/0179472 A1*  9/2004  Khalilzadeh et al. ......... 370/227
2005/0058060 A1*  3/2005  Caldwell et al. .............. 370/216
2007/0135517 A1*  6/2007  Maruyama et al. ........... 514/473

FOREIGN PATENT DOCUMENTS

CN    101162949 A    4/2008
CN    102006188 A    4/2011
EP      1942604 A1    7/2008

OTHER PUBLICATIONS

International Search Report in international application No. PCT/CN2011/075716, mailed on Sep. 22, 2011.

English Translation of the Written Opinion of the International Search Authority in international application No. PCT/CN2011/075716, mailed on Sep. 22, 2011.

* cited by examiner

PATH SWITCH-BACK METHOD AND APPARATUS IN TRANSPORT NETWORK

TECHNICAL FIELD

The disclosure relates to the field of communication technologies, and more particularly to a path switch-back method and apparatus in a transport network.

BACKGROUND

Multiplex Section Protection (MSP), which is a protection switching technology in transport networks and defined in G.841 of the International Telecommunication Union (ITU), has been widely applied in transport networks currently.

In 1:n MSP, 1+n paths are provided between two network nodes, wherein one is a protection path and the other n paths are working paths. A series of protection switching requests are specified in G.841, e.g. Signal Fail (SF), Signal Degrade (SD), Wait To Restore (WTR), No Request (NR) etc., and different priorities are specified for different protection switching requests by G.841. The priories of the four protection switching requests above are in decreasing order. SF has the highest priority and NR has the lowest priority.

After receiving a remote protection switching request, a node compares a local protection switching request with the remote protection switching request first, outputs a protection switching request with a higher priority, runs operations of a state machine according to an outputted protection switching request with the highest priority subsequently, sends K bytes and performs a protection switching action, and etc.

Figure 1:
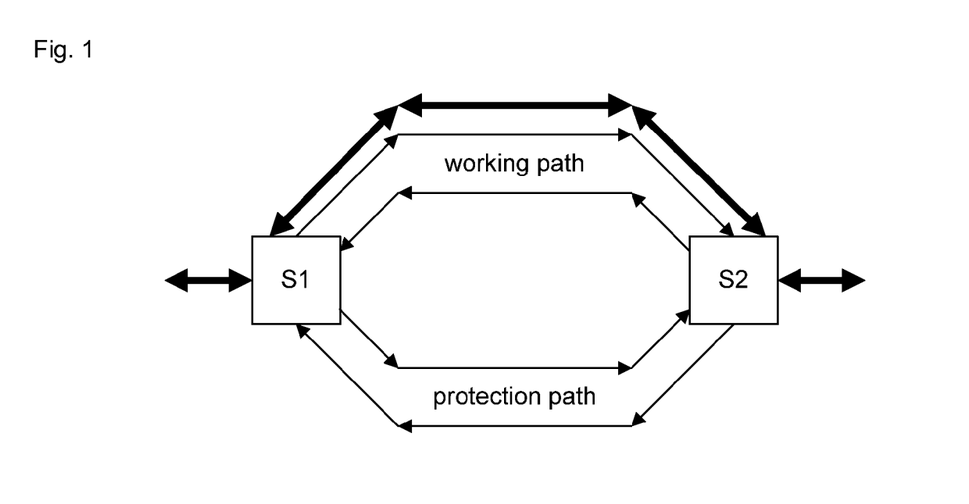
FIG. 1 is a schematic diagram illustrating 1:1 MSP.
Figure 2:
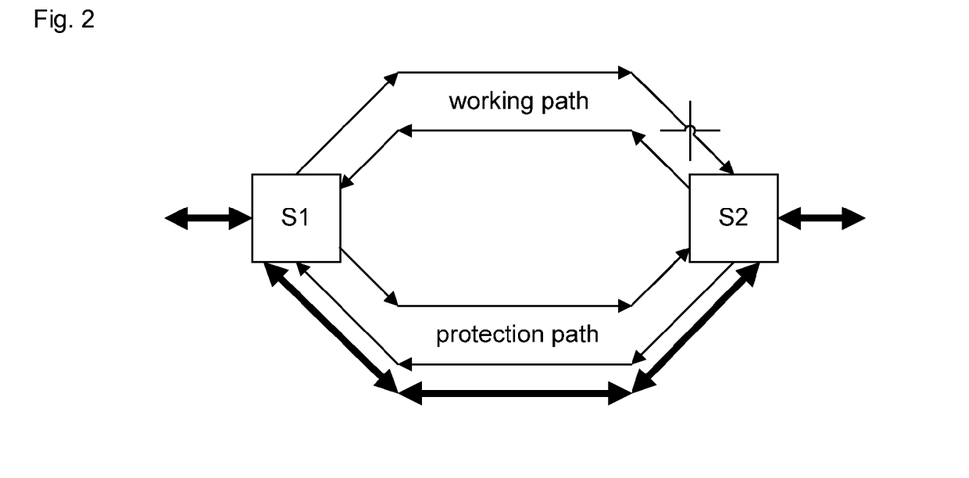
FIG. 2 is a schematic diagram illustrating MSP of a local working path fault.

FIG. 1 shows a schematic diagram of 1:1 MSP, one working path and one protection path are provided between node S1 and node S2. When the working path and the protection path are normal, both node S1 and node S2 will select the working path to send and receive flows. When a fault is detected at a working path from node S1 to node S2, as shown in FIG. 2, node S2 detects SF of a local working path, generates an a protection switching request for the SF of the local working path, and node S2 does not have other protection switching requests, thus SF of the local working path is a protection switching request with the highest priority. Since a remote protection switching request of node S2 is NR, which has a lower priority than SF of the local working path, the protection switching request with the highest priority of node S2 is SF of the local working path. Node S2 runs operations of a state machine, sends K bytes on the protection path and switches to the protection path to receive and send flows, wherein the K bytes include the protection switching request for SF of the working path of node S2 and information switched to the protection path. After receiving the K bytes on the protection path, node S1 extracts the protection switching request therein. The local protection switching request with the highest priority of node S1 is NR whose priority is lower than that of the remote protection switching request, therefore, the protection switching request with the highest priority of node S1 is SF of the working path. Node S1 runs operations of the state machine, and according to the received K-byte information switched to the protection path, switches to the protection path to receive and send flows. In addition, node S1 further needs to send K bytes on the protection path, wherein a K-byte protection switching request is a Reverse Request (RR), and information switched to the protection path, wherein the RR is used to acknowledge that a protection switching request from an opposite node is received.

After node S1 to Node S2 finish the switching, flows are sent and received on the protection path. When the working path from node S1 to node S2 is recovered from fault, node S2 detects SF removal of the local working path and generates a protection switching request for the SF removal of the local working path, wherein the request is also a local protection switching request with the highest priority. Since the remote protection switching request received by node S2 is an RR, the RR will not be involved in comparison of the priorities of protection switching requests according to definitions of G.841, therefore, the protection switching request with the highest priority of node S2 is the SF removal of the local working path. Node S2 runs operations of the state machine and enters a WTR state. After the WTR state ends, node S2 performs a switch-back operation, and sends K bytes to notify node S1 to also perform switch-back. After both node S1 and node S2 perform the switch-back, flows are sent and received on the working path.

G.841 protocol solve problems of 1:n MSP perfectly. However, G.841 protocol has some defects because actual networks are relatively complicated, especially in scenarios such as simultaneous restoration of failed links in the two directions of a working path between nodes at two ends.

Figure 3:
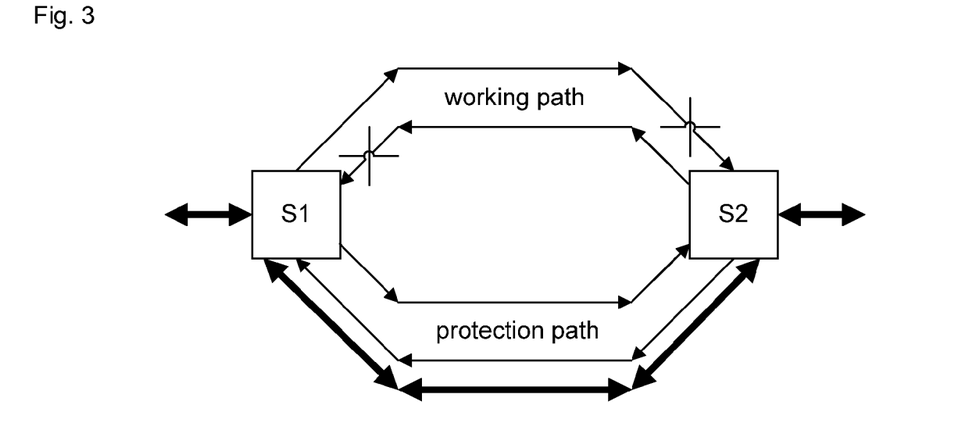
FIG. 3 is a schematic diagram illustrating MSP for faults detected by nodes of two ends.

As shown in FIG. 3, when all links in the two directions of the working path between node S1 and node S2 are failed, remote protection switching requests received by node S1 and node S2 are protection switching requests for SF of the working path. When the links in the two directions are restored simultaneously, node S1 and node S2 detect SF removal of the local working path simultaneously. When a local protection switching request is compared with a remote protection switching request, since the remote protection switching request is SF of the working path, whose priority is higher than that of the local protection switching request, both node S1 and node S2 fail to respond to a protection switching request for the SF removal of the working path. Node S1 and node S2 respond to the remote protection switching request instead and will send an RR request to the opposite node. After receiving the RR request of the opposite node, node S1 and node S2 will not enter the WTR state according to the state machine. Therefore, the nodes at the two ends can neither enter the WTR state according to a normal process, nor switch back to the working path normally to receive and send flows.

Therefore, G.841 protocol has the disadvantage that switch-back cannot be performed in scenarios such as simultaneous restoration of failed links in two directions of the working path between the nodes at the two ends, and there is no solution currently.

SUMMARY

The embodiments of the disclosure provide a path switch-back method and apparatus in a transport network to avoid the problem that switch-back cannot be performed to a working path from a protection path when links in two directions of a working path between nodes in a transport network are restored from fault simultaneously.

An embodiment of the disclosure provides a path switch-back method, including:

a local node determines that two failed links on a working path between an opposite node and itself are restored to normal simultaneously;

the local node enters a WTR state; and the local node switches a signal back to the working path when the WTR state ends.

The determining, by a local node, that two failed links on a working path between an opposite node and itself are restored to normal simultaneously may include:

the local node receives a protection switching request sent by the opposite node and determines that the protection switching request is an RR; and the local node determines that a latest protection switching request sent to the opposite node or a protection switching request which needs to be sent to the opposite node currently is also an RR.

Further, the determining, by a local node, that two failed links on a working path between an opposite node and itself are restored to normal simultaneously may further include:

the local node determines that it is in an SF state before sending an RR to the opposite node.

Before the local node switches a signal back to the working path when the WTR state ends, the method may further include:

in the WTR state, monitoring, by the local node, whether a protection switching request with a higher priority than that of an RR protection switching request is received.

Further, the switching, by the local node, a signal back to the working path when the WTR state ends may include:

when determining that the protection switching request with a higher priority than that of the RR protection switching request is not received during the WTR state, the local node switches a signal back to the working path when the WTR state ends.

An embodiment of the disclosure provides a path switch-back apparatus in a transport network, including:

a fault restoration determining unit configured to determine that two failed links on a working path between a local node and an opposite node are restored to normal simultaneously;

a WTR state entering unit configured to make the local node enter a WTR state; and a switch-back unit configured to switch a signal at the local note back to the working path when the WTR state ends;

wherein the fault restoration determining unit includes:

a first determining unit configured to determine that a protection switching request sent by the opposite node to the local node is an RR;

a second determining unit configured to determine that a latest protection switching request sent by the local node to the opposite node or a protection switching request which needs to be sent to the opposite node currently is also an RR.

Further, the fault restoration determining unit may further include:

a third determining unit configured to determine that the local node is in an SF state before the local node sends an RR to the opposite node.

Further, the apparatus may further include:

a monitoring unit configured to, when the local node is in the WTR state, monitor whether the local node receives a protection switching request with a higher priority than that of an RR protection switching request, wherein when the monitoring unit determines that the local node does not receive the protection switching request with a higher priority than that of the RR protection switching request in the WTR state, the switch-back unit switches a signal back to the working path when the WTR state ends.

According to the embodiments of the disclosure, a local node determines two failed links on a working path between an opposite node and itself are restored to normal simultaneously; the local node enters a WTR state; and the local node switches a signal back to the working path when the WTR state ends. Thus the signal can be switched back to the working path from a protection path when the links in two directions of the working path between nodes in a transport network are restored from fault simultaneously.

DETAILED DESCRIPTION

The embodiments of the disclosure provide a path switch-back method and apparatus in a transport network to avoid the problem that switch-back cannot be performed to a working path from a protection path when links in two directions of the working path between nodes in the transport network are restored from fault simultaneously, thus ensuring normal operation of MSP and switch-back to the working path in scenarios such as simultaneous restoration of nodes at two ends in MSP.

The technical schemes provided by the embodiments of the disclosure will be described below in combination with the accompanying drawings.

Figure 4:
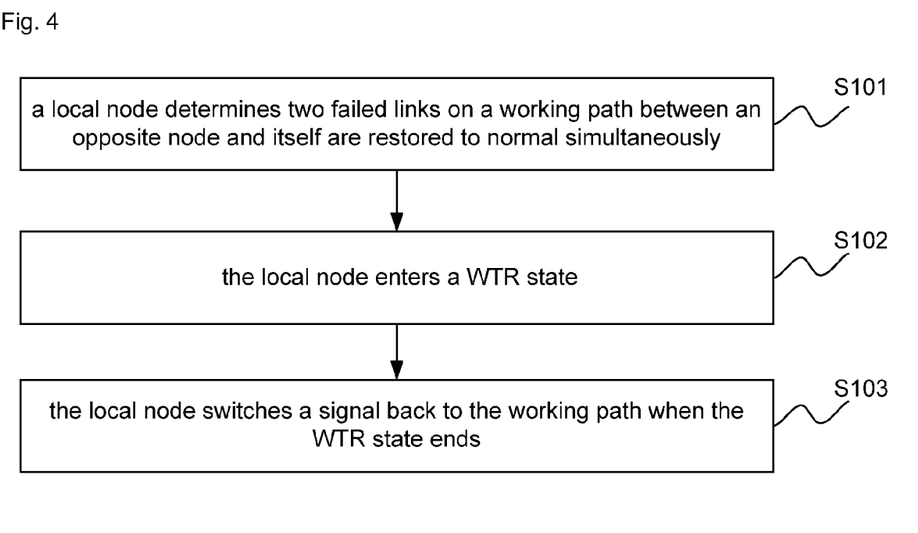
FIG. 4 is a flowchart of a path switch-back method in a transport network according to an embodiment of the disclosure.

As shown in FIG. 4, a path switch-back method in a transport network according to an embodiment of the disclosure includes the following steps:

S101: a local node determines that two failed links on a working path between an opposite node and itself are restored to normal simultaneously;

i.e. the local node determines that a protection switching request for SF removal of the working path is generated by the opposite node and itself simultaneously;

S 102: the local node enters a WTR state;

S 103: the local node switches a signal back to the working path when the WTR state ends.

Preferably, the step that the local node determines that the two failed links on the working path between the opposite node and itself are restored to normal simultaneously includes:

the local node receives a protection switching request sent by the opposite node and determines that the protection switching request is an RR, and the local node determines that the latest protection switching request sent to the opposite node or a protection switching request which needs to be sent to the opposite node currently is also an RR.

Preferably, the step that the local node determines the two failed links on the working path between the opposite node and itself are restored to normal simultaneously further includes:

the local node determines that it is in an SF state currently before sending the RR to the opposite node.

Preferably, before the local node switches a signal back to the working path when the WTR state ends, the method further includes:

in the WTR state, the local node monitors whether a protection switching request with a higher priority than that of an RR protection switching request is received.

Preferably, the step that the local node switches the signals back to the working path when the WTR state ends includes:

when determining that the protection switching request with a higher priority than that of the RR protection switching request is not received in the WTR state, the local node switches a signal back to the working path when the WTR state ends.

Thus it can be seen that the embodiment of the disclosure optimizes an MSP state machine and is applied in scenarios such as simultaneous restoration of nodes at two ends from a protection path to a working path, in which the nodes cannot enter a WTR state immediately after the working path is restored from fault, however, when receiving an RR sent by the opposite node, the nodes can compare a received RR with a sent RR, as well as the previous state, so that the nodes at two ends can enter the WTR state and then switch back to the working path after the WTR state ends, thus avoiding the problem that MSP cannot be switched back to a working path in scenarios such as simultaneous restoration of the working path of nodes at two ends.

Figure 5:
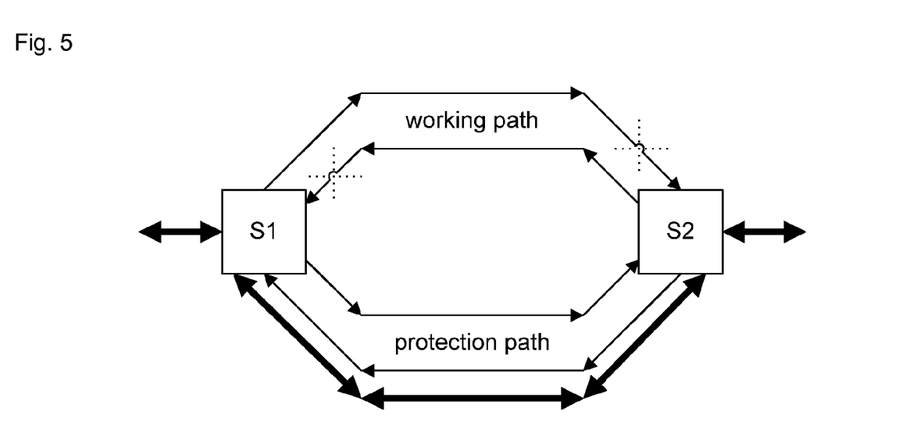
FIG. 5 is a schematic diagram illustrating MSP networking provided by an embodiment of the disclosure.

For example, FIG. 5 shows a schematic diagram illustrating MSP networking provided by an embodiment of the disclosure. The links in the two directions of a working path between node S1 and node S2 are failed. When these two links are restored to normal simultaneously, node S1 and node S2 detect SF removal of a local working path simultaneously, and generates a protection switching request for the SF removal. When comparing a local protection switching request (SF removal) and a remote (i.e. from an opposite node) protection switching request with the highest priority, since the remote protection switching request is working path SF whose priority is higher than that of the local protection switching request, node S1 and node S2 cannot respond to the protection switching request for the SF removal of the working path. Instead, node S1 and node S2 respond to the protection switching request (SF removal) from the opposite node, and will send an RR request to the opposite node. After node S1 and node S2 receive the RR request from the opposite node, according to the technical scheme provided by the embodiment of the disclosure, node S1 determines that the latest protection switching request sent to node S2 or a protection switching request which needs to be sent to node S2 currently is an RR request, and the previous state is an SF state. Therefore, node S1 enters a WTR state. Similarly, node S2 will also enter the WTR state. After the WTR state ends, node S1 and node S2 will switch back to the working path, and receive and send signals on the working path, and the network is restored to normal.

Figure 6:
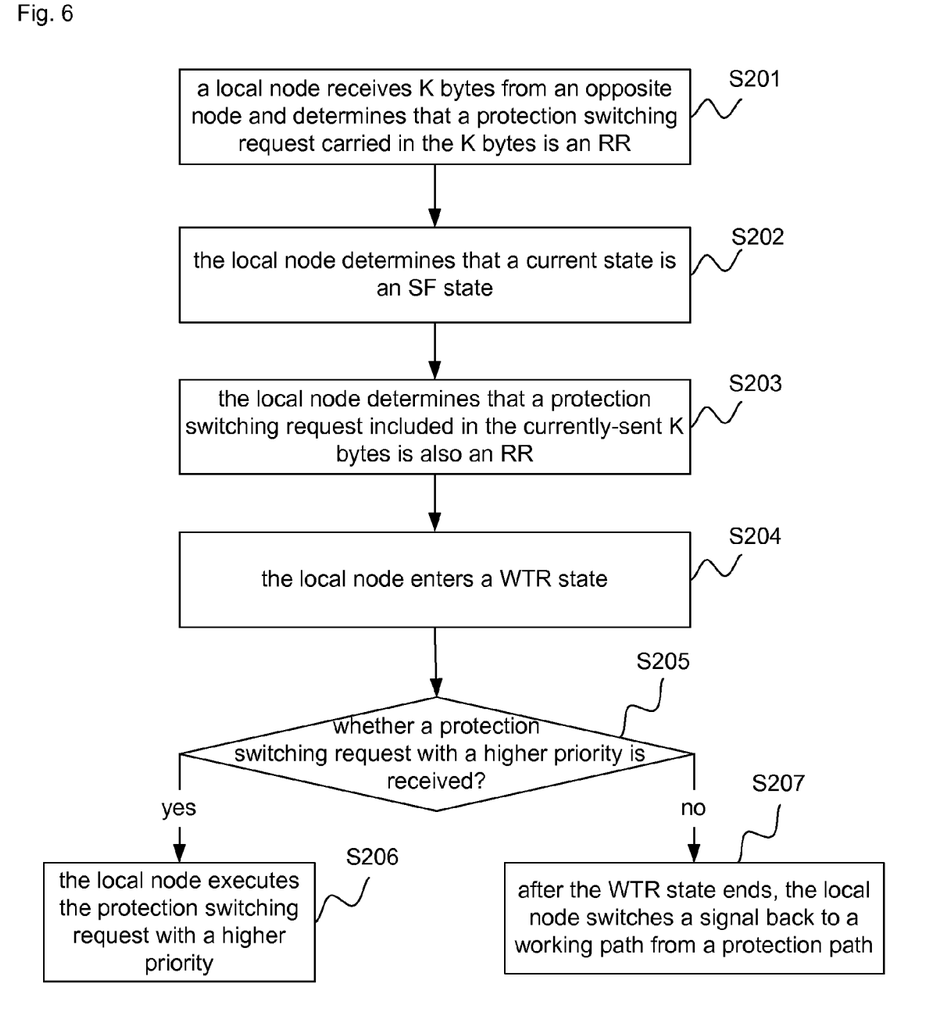
FIG. 6 is a flowchart of a path switch-back method in a transport network according to an embodiment of the disclosure.

As shown in FIG. 6, a path switch-back method in a transport network according to an embodiment of the disclosure specifically includes the following steps:

S 201: a local node receives K bytes from an opposite node and determines that a protection switching request carried in the K bytes is an RR;

S202: the local node determines that a current state is an SF state;

S 203: the local node determines that a protection switching request included in the currently-sent K bytes is also an RR;

S 204: the local node enters a WTR state;

S 205: in the WTR state, the local node determines whether a protection switching request (e.g. SF) with a higher priority than that of the protection switching priority of an RR is received; if received, S 206 is executed; otherwise, S 207 is executed;

S 206: the local node executes the protection switching request with a higher priority; and S 207: after the WTR state ends, the local node switches a signal back to a working path from a protection path.

Although illustrated by 1:1 MSP, the technical scheme provided by the embodiment of the disclosure is also applied to 1:n MSP.

Figure 7:
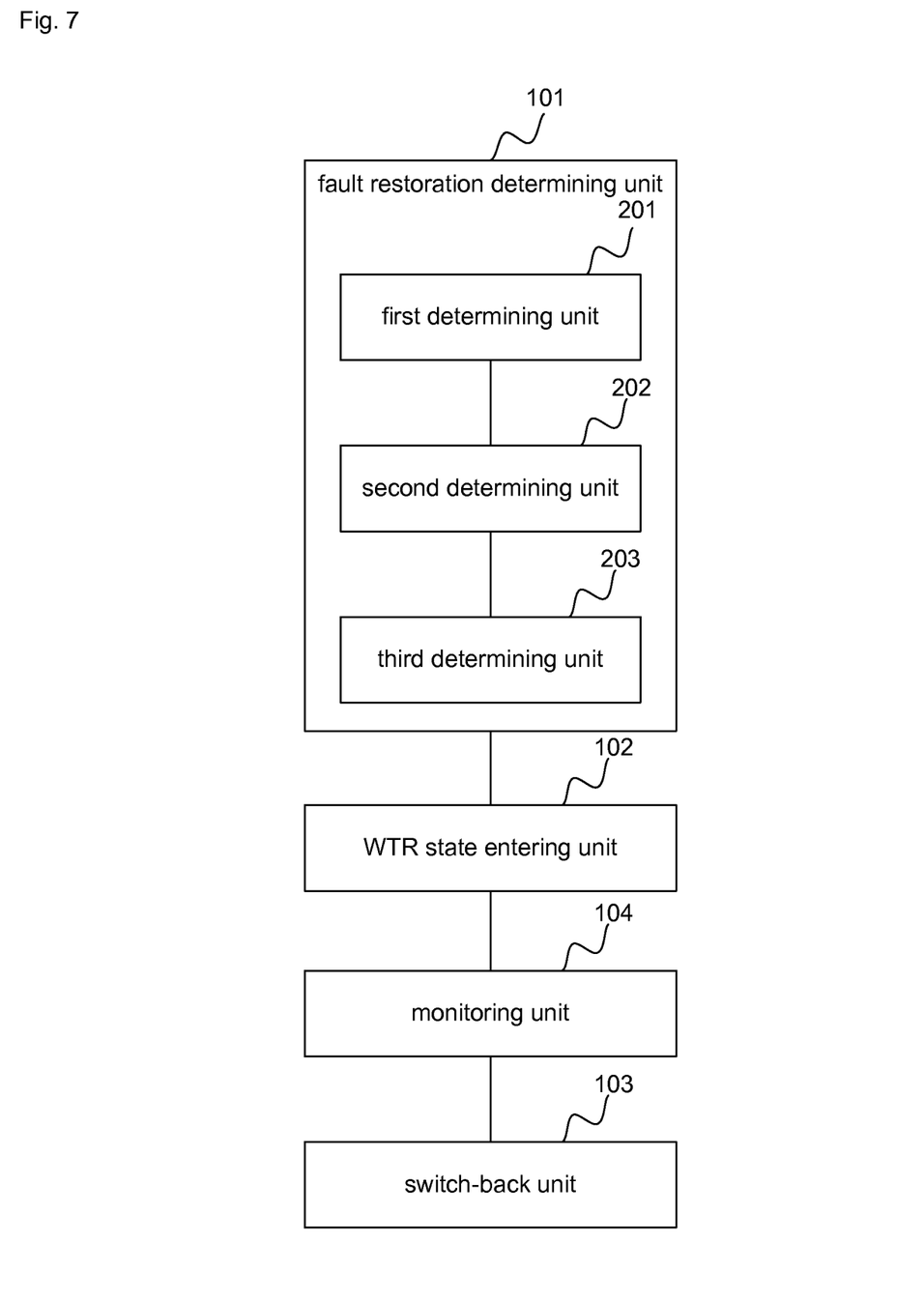
FIG. 7 is a structural diagram of a path switch-back apparatus in a transport network according to an embodiment of the disclosure.

As shown in FIG. 7, a path switch-back apparatus in a transport network according to an embodiment of the disclosure includes:

a fault restoration determining unit 101 configured to determine two failed links on a working path between a local node and an opposite node are restored to normal simultaneously;

a WTR state entering unit 102 configured to make the local node enter a WTR state;

a switch-back unit 103 configured to switch a signal at the local node back to the working path when the WTR state ends.

Preferably, the fault restoration determining unit 101 includes:

a first determining unit 201 configured to determine that a protection switching request sent by the opposite node to the local node is an RR;

a second determining unit 202 configured to determine that the latest protection switching request sent by the local node to the opposite node or a protection switching request which needs to be sent to the opposite node currently is also an RR.

Preferably, the fault restoration determining unit 101 further includes:

a third determining unit 203 configured to determine that the local node is in an SF state before the local node sends the RR to the opposite node.

Preferably, the apparatus further includes:

a monitoring unit 104 configured to, when the local node is in the WTR state, monitor whether the local node receives a protection switching request with a higher priority than that of the RR protection switching request.

Preferably, when the monitoring unit 104 determines that the local node does not receive the protection switching request with a higher priority than that of the RR protection switching request in the WTR state, the switch-back unit 103 switches a signal back to the working path when the WTR state ends.

To sum up, the embodiments of the disclosure optimize an MSP state machine. According to the characteristic that a protection switching request included in K bytes sent after operations of a state machine of a node is an RR when the priority of a received remote protection switching request is higher than the priority of a local protection switching request during MSP, a node will enter a WTR state when a protection switching request received by the node from an opposite node is an RR and a protection switching request currently sent by the node is also an RR and if the previous state of the node is an SF state, thus solving the problem that switch-back cannot be performed in a scenario that fault restoration is detected at two ends simultaneously in G.841 protocols and other scenarios.

Those skilled in the art should understand that the embodiments of the disclosure may be provided as methods, systems, or computer program products. Therefore, the disclosure may be implemented by hardware only, or software only, or the combination of software and hardware. Furthermore, the disclosure may take the form of a computer program product, which is implemented on one or more computer-usable storage media (including, but not limited to, disk memory, optical memory, and so forth) including computer-usable program codes.

The disclosure has been described with reference to flow diagrams and/or block diagrams of methods, apparatuses (systems) and computer program products according to the embodiments of the disclosure. It should be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, a special purpose computer, or an embedded processor or other programmable data processing apparatuses to produce a machine, such that devices for implementing functions specified in one or more flows in the flow diagrams and/or one or more blocks in the block diagrams can be implemented by the instructions which are executed via the processor of a computer or other programmable data processing apparatuses.

These computer program instructions may also be stored in a computer readable memory that can direct a computer or other programmable data processing apparatuses to work in a particular manner, such that the instructions stored in the computer-readable memory produce products including an instruction device which implements the functions specified in one or more flows in the flow diagrams and/or one or more blocks in the block diagrams.

These computer program instructions may also be loaded onto a computer or other programmable data processing apparatuses so that a series of operational steps can be performed on the computer or other programmable apparatuses to generate a computer implemented process such that the instructions which are executed on the computer or other programmable apparatuses provide steps for implementing the functions specified in one or more flows in the flow diagrams and/or one or more blocks in the block diagrams.

Apparently, those skilled in the art may make various modifications and variations to the disclosure without departing from the spirit and scope of the disclosure. Thus, the disclosure is intended to cover these modifications and variations if they fall within the scope of the claims of the disclosure and equivalent technologies thereof.

What is claimed is:

1. A path switch-back method in a transport network, comprising:
    determining, by a local node, that two failed links on a working path between an opposite node and itself are restored to normal simultaneously;
    entering, by the local node, a Wait To Restore (WTR) state; and
    switching, by the local node, a signal back to the working path when the WTR state ends;
    wherein the determining, by a local node, that two failed links on a working path between an opposite node and itself are restored to normal simultaneously comprises:
        receiving, by the local node, a protection switching request sent by the opposite node and determining that the protection switching request is a Reverse Request (RR); and
        determining, by the local node that a latest protection switching request sent to the opposite node or a protection switching request which needs to be sent to the opposite node currently is also an RR.

2. The method according to claim 1, wherein the determining, by a local node, that two failed links on a working path between an opposite node and itself are restored to normal simultaneously further comprises:
    determining, by the local node, that it is in a Signal Fail (SF) state before sending an RR to the opposite node.

3. The method according to claim 1, further comprising before the local node switches a signal back to the working path when the WTR state ends:
    in the WTR state, monitoring, by the local node, whether a protection switching request with a higher priority than that of an RR protection switching request is received.

4. The method according to claim 3, wherein the switching, by the local node, a signal back to the working path when the WTR state ends comprises:
    when the local node determines that the protection switching request with a higher priority than that of the RR protection switching request is not received in the WTR state, switching, by the local node a signal back to the working path when the WTR state ends.

5. A path switch-back apparatus in a transport network, comprising:
    a memory storing programming instructions; and
    a processor configured to be capable of executing the stored programming instructions to perform steps comprising:
        determining that two failed links on a working path between a local node and an opposite node are restored to normal simultaneously;
        making the local node enter a WTR state; and
        switching a signal at the local note back to the working path when the WTR state ends;
        wherein the step of determining that two failed links on a working path between a local node and an opposite node are restored to normal simultaneously comprises:
            receiving, by the local node, a protection switching request sent by the opposite node and determining that the protection switching request is a Reverse Request (RR); and
            determining, by the local node that a latest protection switching request sent to the opposite node or a protection switching request which needs to be sent to the opposite node currently is also an RR.

6. The apparatus according to claim 5, wherein the processor is further configured to be capable of executing the stored programming instructions to perform steps further comprising:
    determining that the local node is in a Signal Fail (SF) state before the local node sends an RR to the opposite node.

7. The apparatus according to claim 5, wherein the processor is further configured to be capable of executing the stored programming instructions to perform steps further comprising:
    when the local node is in the WTR state, monitoring whether the local node receives a protection switching request with a higher priority than that of an RR protection switching request.

8. The apparatus according to claim 7, wherein the processor is further configured to be capable of executing the stored programming instructions to perform steps further comprising:
    when determining that the local node does not receive the protection switching request with a higher priority than that of the RR protection switching request in the WTR state, switching a signal back to the working path when the WTR state ends.

* * * * *

UNITED STATES PATENT AND TRADEMARK OFFICE
CERTIFICATE OF CORRECTION

| | | |
|---|---|---|
| PATENT NO. | : 9,071,513 B2 | Page 1 of 1 |
| APPLICATION NO. | : 13/885639 | |
| DATED | : June 30, 2015 | |
| INVENTOR(S) | : Shaoyong Wu | |

It is certified that error appears in the above-identified patent and that said Letters Patent is hereby corrected as shown below:

Title Page, please delete:
Item "(74) Attorney, Agent or Firm - Oppendahl Patent Law Firm LLC"

and insert the following correction:
Item --(74) Attorney, Agent, or Firm - Oppedahl Patent Law Firm LLC--

Signed and Sealed this
Seventeenth Day of November, 2015

Michelle K. Lee
*Director of the United States Patent and Trademark Office*